(12) United States Patent
Crawford et al.

(10) Patent No.: US 9,299,266 B2
(45) Date of Patent: Mar. 29, 2016

(54) SYSTEM FOR PERFORMING ASSESSMENT WITHOUT TESTING

(75) Inventors: Elizabeth Catherine Crawford, Somerville, MA (US); Yaacov Petscher, Tallahassee, FL (US); Christopher Schatschneider, Tallahassee, FL (US)

(73) Assignee: LEXIA LEARNING SYSTEMS LLC, Concord, MA (US)

( * ) Notice: Subject to any disclaimer, the term of this patent is extended or adjusted under 35 U.S.C. 154(b) by 75 days.

(21) Appl. No.: 13/209,722

(22) Filed: Aug. 15, 2011

(65) Prior Publication Data

US 2012/0077173 A1    Mar. 29, 2012

Related U.S. Application Data

(60) Provisional application No. 61/386,089, filed on Sep. 24, 2010.

(51) Int. Cl.
G09B 7/02    (2006.01)

(52) U.S. Cl.
CPC ........................................ *G09B 7/02* (2013.01)

(58) Field of Classification Search
CPC ........................................................ G09B 7/02
USPC .......................................................... 434/322
See application file for complete search history.

(56) References Cited

U.S. PATENT DOCUMENTS

| | | | | |
|---|---|---|---|---|
| 5,059,127 A | * | 10/1991 | Lewis et al. | 434/353 |
| 6,144,838 A | * | 11/2000 | Sheehan | 434/362 |
| 6,322,366 B1 | * | 11/2001 | Bergan et al. | 434/118 |
| 7,440,725 B2 | * | 10/2008 | Roussos | 434/353 |
| 7,828,552 B2 | * | 11/2010 | Shute et al. | 434/118 |
| 2004/0063085 A1 | * | 4/2004 | Ivanir et al. | 434/322 |
| 2006/0166174 A1 | * | 7/2006 | Rowe et al. | 434/236 |
| 2007/0009871 A1 | * | 1/2007 | Tidwell-Scheuring et al. | 434/350 |
| 2008/0227077 A1 | * | 9/2008 | Thrall et al. | 434/322 |
| 2008/0254433 A1 | * | 10/2008 | Woolf et al. | 434/332 |
| 2009/0035733 A1 | * | 2/2009 | Meitar et al. | 434/118 |
| 2009/0162827 A1 | * | 6/2009 | Benson et al. | 434/350 |

OTHER PUBLICATIONS

Wikipedia—Report Card: Progress Reports, Web Archive, Web. 2007. <https://web.archive.org/web/20071208210355/http://en.wikipedia.org/wiki/Report_card>.*

(Continued)

*Primary Examiner* — Sam Yao
*Assistant Examiner* — Thomas Hong (57) ABSTRACT

A system for educational assessment without testing is provided that includes one or more client systems that are connected to a network allowing students or school officials to communicate with an education framework that performs and manages educational assessment. The one or more client systems issue a message to the education framework requesting a task to be performed. The educational assessment is administered independent of one or more educators so as to avoid interruption of instruction time. A server system receives the message and the education framework proceeds to process the contents of the message. The education framework includes a plurality of programming modules being executed on the server system that provides to educators specific information used for the educational assessment based on the contents of the message. The programming modules assist in calculating and determining one or more parameters for the educational assessment of the students as well as providing specific reports to educators as to the progress of the students.

24 Claims, 8 Drawing Sheets

(56) References Cited

OTHER PUBLICATIONS

Florida Assessments for Instruction in Reading, Florida Center for Reading Research, 2009, 2 pages.

Torgesen, J.K., "A Comprehensive K-3 Reading Assessment Plan", Center on Instruction, 2006, 24 pages.

Florida Center for Reading Research, "Florida Assessments for Instruction in Reading" Technical Manual, 2009-2010 Edition, Grades 3-12, 78 pages.

Florida Center for Reading Research, "Florida Assessments for Instruction in Reading" Technical Manual, 2009-2010 Edition, Grades Kindergarten-Grade 2, 105 pages.

* cited by examiner

FIG. 1

| Grade | Performance Predictor or Skill Set | Number of Minutes (Avg Min/Week) |
|---|---|---|
| Kindergarten | 80% - 100% | 20 - 30 min/wk |
| Kindergarten | 51% - 79% | 30 - 40 min/wk |
| Kindergarten | 31% - 50% | 40 - 50 min/wk |
| Kindergarten | 1% - 30% | 50 - 70 min/wk |
| 1st - 3rd | 80% - 100% | 20 - 40 min/wk |
| 1st - 3rd | 51% - 79% | 40 - 60 min/wk |
| 1st - 3rd | 31% - 50% | 60 - 80 min/wk |
| 1st - 3rd | 1% - 30% | 80 - 100 min/wk |
| 4th - 6th | Intermediate | 40 - 60 min/wk |
| 4th - 6th | Elementary | 60 - 90 min/wk |
| 4th - 6th | Basic | 90 - 120 min/wk |
| 7th - 12th | Intermediate | 50 - 70 min/wk |
| 7th - 12th | Elementary | 70 - 100 min/wk |
| 7th - 12th | Basic | 100 - 150 min/wk |

| | Name | Grade | Performance Predictor | Prescription of Intensity | | Actual Software Usage (Avg Mins/Week) | Current Assignment (Level of Material) | Certificate Available |
|---|---|---|---|---|---|---|---|---|
| | | | | Teacher Directed Lexia Lessons | Recommended Software Usage (Avg Mins/Week) | | | |
| | Mize, Ebony | 1st | 1% | | 80-100 | 10 | ER L1 (Pre K) | |
| ⓘ | Paquette, Kaleigh | 1st | 4% | 📖 | 80-100 | 34 | PR L1 (Mid K) | |
| | Donald, Adrian | 1st | 13% | | 80-100 | 10 | PR L2 (Beg 1st) | |
| ⓘ | Gauthier, Anthony | 1st | 22% | 📖 | 80-100 | 14 | PR L1 (Mid K) | |
| ⓘ | Portillo, Jacob | 1st | 37% | 📖 | 60-80 | 5 | PR L2 (Beg 1st) | |
| ⓘ | Fugate, Kyle | 1st | 49% | 📖 | 60-80 | 12 | PR L2 (Beg 1st) | |
| | Kowalski, Vincent | 1st | 55% | 📖 | 40-60 | 22 | PR L2 (Beg 1st) | |
| ⓘ | Newsom, Alexa | 1st | 61% | 📖 | 40-60 | 16 | PR L2 (Beg 1st) | |
| | Yost, Karia | 1st | 76% | | 40-60 | 38 | PR L2 (Beg 1st) | |
| ⓘ | Deihl, Thoraya | 1st | 81% | 📖 | 20-40 | 41 | PR L3 (Mid 1st) | |
| ⓘ | Aviles, Oscar | 1st | 85% | | 20-40 | 37 | PR L3 (Mid 1st) | |
| ⓘ | Durant, Jacob | 1st | 88% | 📖 | 20-40 | 23 | PR L2 (Beg 1st) | |
| | Prado, Jessica | 1st | 90% | | 20-40 | 47 | PR L3 (Mid 1st) | |
| | Rockwell, Juan | 1st | 99% | | 20-40 | 40 | PR L3 (Mid 1st) | |
| ⓘ | Shuler, Priscilla | 1st | 100% | | 20-40 | 46 | PR L4 (Beg 2nd) | |
| | Wetzel, Luis | 1st | 100% | | 20-40 | 55 | PR L4 (Beg 2nd) | |

ⓘ Indicates Instruction Needed.

Learn More about Level of Material.

FIG. 8

SYSTEM FOR PERFORMING ASSESSMENT WITHOUT TESTING

PRIORITY INFORMATION

This application claims priority from U.S. Provisional Application Ser. No. 61/386,089 filed Sep. 24, 2010, which is incorporated herein by reference in its entirety.

BACKGROUND OF THE INVENTION

The invention is related to the field of educational assessment, and in particular using an education framework that allows teachers, schools and districts to assess the educational needs of their students without stopping instruction to administer a traditional test.

Educational assessment is the process of documenting, usually in measurable terms, knowledge, skills, attitudes and beliefs. Assessment can focus on the individual learner, the learning community (class, school, district or other organized group of learners), the institution, or the educational system as a whole. According to Dr. Joe Torgesen, "The goal [of an assessment plan] is to gain enough information about student progress to make effective decisions while minimizing the time spent administering assessments."

Assessment is often divided into formative and summative categories for the purpose of considering different objectives for assessment practices. Summative assessment is generally carried out at the end of a course or project. In an educational setting, summative assessments are typically used to assign students a course grade. Formative assessment is generally carried out throughout a course or project. Formative assessment is used to assess student progress and aid in making instructional changes. In an educational setting, formative assessment is most typically seen as frequent progress monitoring of student performance and would not necessarily be used for grading purposes, but rather for determining if a student is learning in his/her current environment.

Summative and formative assessments are often referred to in a learning context as assessment of learning and assessment for learning respectively. Assessment of learning is generally summative in nature and intended to measure learning outcomes and report those outcomes to students, parents, and administrators. Assessment of learning generally occurs at the conclusion of a unit, class, semester, or academic year. Assessment for learning is generally formative in nature and is used by teachers to consider approaches to teaching and next steps for individual learners and the class.

Summative and formative assessments can be seen as the overarching umbrella terms of assessment. Under these two categories are four types of assessment: screening, progress monitoring, diagnostic, and outcome assessments. Typically, screening tools, and progress monitoring assessments fall under the category of formative while diagnostic and outcome measures fall under the summative category.

Screening tools, often referred to as 'universal screeners' provide schools with a tool that provides a quick way to assess all of the students in a particular grade or the whole school. These screeners give teachers and administrators a general sense of whether or not the student is on course for typical progress, needs some attention or is at great risk for reading failure. Those who score in the needing some attention or at high risk categories are usually identified as students who will be progress monitored using formative assessment tools. The frequency of these progress monitoring tests varies depending on the level of risk (i.e., the higher the risk, the more often the students are assessed). The results of the progress monitoring assessments are used by teachers to determine if the students are responding, or learning, in their current educational environment and if not, adjust the instructional intensity for the students.

Diagnostic Assessments traditionally provide an overall profile of a student's ability and can be thought of as summative, but subtests of larger diagnostic tools can be used as screeners or progress monitoring measures and therefore be classified as formative. Diagnostic assessments are lengthier in administration and therefore should only be given when additional or more reliable information can be gained from the test. Outcome measures are strong examples of summative assessment. They typically are given toward the end of the school year and provide answers to the whether or not the student is able to apply the knowledge he/she has learned and can also indicate how effective overall instruction has been for the class or school.

There is a need for assessing student abilities while at the same time allowing teachers, school and district level administrators better, more timely, access to information from the assessments. The invention uses a novel technique for assessment that allows teachers/schools/districts to obtain assessment-quality data to make effective decisions without stopping instruction to administer a traditional test.

SUMMARY OF THE INVENTION

According to one aspect of the invention, there is provided a system for educational assessment without testing. The system includes one or more client systems that are connected to a network allowing students or educators to communicate with an education framework that performs and manages educational assessment. The one or more client systems issue a message to the education framework requesting a task to be performed. The educational assessment is administered independent of one or more educators so as to avoid interruption of instruction time. A server system receives the message and the education framework proceeds to process the contents of the message. The education framework includes a plurality of programming modules being executed on the server system that provides to the educators specific information used for the educational assessment based on the contents of the message. The programming modules assist in calculating and determining one or more parameters for the educational assessment of the students as well as providing specific reports to the educators as to the progress of the students.

According to another aspect of the invention, there is provided a method of performing educational assessment without comprising a test event. The method includes providing one or more client systems that are connected to a network allowing students or educators to communicate with an education framework that performs and manages educational assessment. The one or more client systems issue a message to the education framework requesting a task to be performed. The educational assessment is administered independent of one or more educators so as to avoid interruption of instruction time. The method includes receiving the message and the education framework proceeds to process the contents of the message. The education framework includes a plurality of programming modules being executed on a server system that provides to the educators specific information used for the educational assessment based on the contents of the message. The programming modules assist in calculating and determining one or more parameters for the educational assessment of the students as well as providing specific reports to the educators as to the progress of the students.

According to another aspect of the invention, there is provided a computer readable medium for storing a program being executed on an education framework, the program performs a method of performing educational assessment without comprising a test event. The method includes providing one or more client systems that are connected to a network allowing students or educators to communicate with an education framework that performs and manages educational assessment. The one or more client systems issue a message to the education framework requesting a task to be performed. The educational assessment is administered independent of one or more educators so as to avoid interruption of instruction time. The method includes receiving the message and the education framework proceeds to process the contents of the message. The education framework includes a plurality of programming modules being executed on a server system that provides to the educators specific information used for the educational assessment based on the contents of the message. The programming modules assist in calculating and determining one or more parameters for the educational assessment of the students as well as providing specific reports to the educators as to the progress of the students.

DETAILED DESCRIPTION OF THE INVENTION

The invention describes an education framework that allows for educational assessment without testing. The framework uses a novel technique in educational assessment which is then incorporated into a network environment. This allows teachers, and school and district administrators to assess the progress of their students as well as providing graphical illustration and report generation illustrating the progress of the students.

Figure 1:
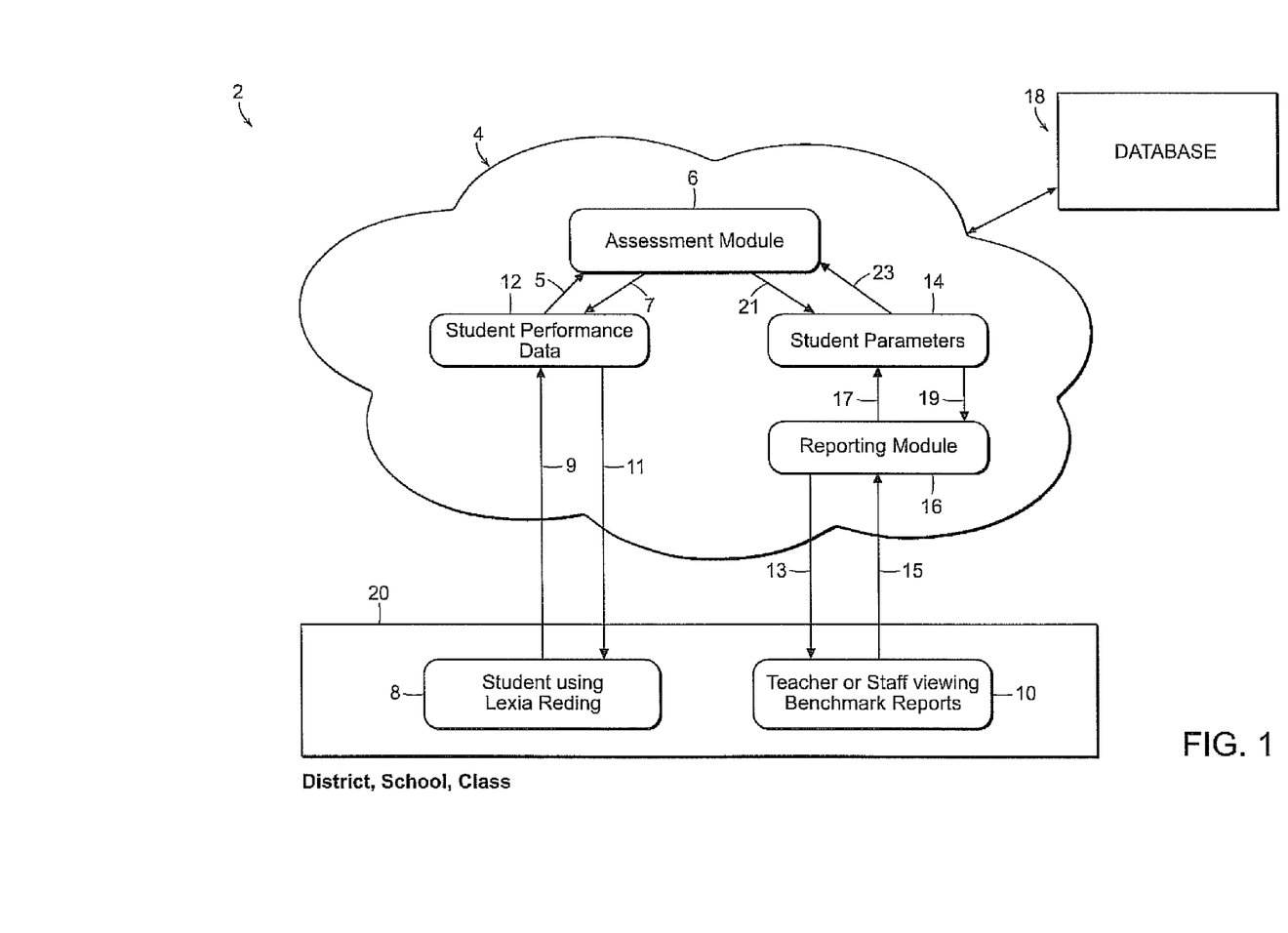
FIG. 1 is a schematic diagram illustrating an education framework used in accordance with the invention.

FIG. 1 is a schematic diagram illustrating a novel education framework 2 used in accordance with the invention. The network framework 2 includes a database 18 as well as a client system 20 and a server system 4 that communicate with each other using commonly known network client-server communication systems. The client system 20 includes one more client computer systems that are coupled via a network. In this case, the client computer systems can include students 8 accessing the server 4 as well as educators 10, such as teachers, school and district officials or administrators, accessing the server 4. The students 8 can access the server 4 using either a password or other authentication means. The students 8 perform their daily skill activities and the data is stored in a database 18 by the server 4. The educators 10 also access the server 4 using either a predefined password or other authentication means. The educators 10 usually access the server 4 to generate reports displaying students' progress as well as each student's performance predictor or skill set, prescription of intensity, and other parameters. The server 4 generates the reports for viewing by the educators 10 using specific graphical representations. Also, the educators 10 are allowed to generate reports specific to a student in a class, class in a school as well as to a school in a district.

The server 4 receives requests for access by the client systems 20. The requests can include standard communication protocols such as TCP/IP or the like. The server 4 processes these requests and performs the selected or requested operations. In this case, the server 4 includes a number of modules to perform the educational assessment. The server 4 includes a student performance data module 12, a report module 16, student parameter module 14, and an assessment module 6.

When a student 8 sends a transmission of data 9 to the database 18, using a client computer system, to the server 4, that transmission 9 includes data generated by the student performing skill activities. The sever 4 receives the transmission 9 and triggers the execution of the assessment module 6. The assessment module 6 assesses the data sent in the transmission 9 received by the server 4 and determines that the student 8 is adding data to their record. The assessment module 6 initiates the activation of the student performance data module 12. The student performance data module 12 issues to the student 8, via a message 11, their individualized skill activities. The student 8 receives the message 11 that contains the individualized skill activities and proceeds in adjusting the pathway of that student 8 in the program. Once the student 8 transmits the performance data 9 to the database 18, the student performance data module 12 analyzes the data 9 from the database 18 and calculates the student's performance data. The student performance data module 12 provides, via a message 5, to the assessment module 6 the student performance data. The assessment module 6 receives the message 5 and calculates the various performance parameters used in the inventive assessment technique. Also, the assessment module 6 stores the performance parameters associated with the student 8 into a database structure 18 for later retrieval or report generation. The database 18 is stored in the server 4.

The educator 10, such as a teacher, school official or district official, can access the server 4 to generate reports or make administrative changes. Using a client system the educator 10 sends a request 15 to the server 4. The server 4 receives the request 15 and initiates the activation of the reporting module 16 that analyzes the request 15 and determines it is from an educator 10. The reporting module 16 initiates the activation of the student parameter module 14.

The reporting module 16 determines whether the request 15 is directed in generating a report and for whom. If the educator 10 is a teacher, then the report module 16 utilizes a report specific to the class of the teacher or their student of interest. If the educator 10 is a school or district administrator, the report module 16 generates a report that include details regarding the educational assessment of the school or district as a whole, which can include the overall assessment of the district, school, grade and particular class. The reporting module 16 provides a user interface that allows an educator 10 to select the criteria of the report they are requesting. The report module 16 analyzes the criteria requested for the report and sends a request 17 to the student parameter module 14 for the required information needed for report generation. The student parameter module 14 analyzes the request 17 and requests via message 23 the student performance and assessment data needed to produce the report requested.

The student parameters module 21 analyzes the message 23 and extracts the information needed to generate the requested report using the information provided by the student parameter module 14. The assessment module 6 formulates a query to the database structure 18 to extract the needed assessment data and students information. After receiving the query from the student parameters module 14, the database structure 18 retrieves the needed assessment data and student information and sends it to the assessment module 6. The student parameters module 14 receives the results of the query and processes the information in a fashion that the reporting module 16 can use, and sends the information via a message 19 to the reporting module 16. The reporting module 16 receives the message 19 and processes the received information by calculating the received assessment data and student information in a fashion that can be used for report generation. The reporting module 16 receives the message 19 and proceeds to produce reports. In particular, the reporting module 16 generates reports based on who is requesting the reports and their access privileges. In this case, a school administrator can receive a report that contains information regarding the assessment of school, grade, class or student; district administrators can receive a report that contains information regarding assessment of the district, school, grade, class or student while a teacher may receive assessment reports showing their class or individual students. Based on the contents in messages 17 and 19, the reporting module 16 generates a report for a specific educator. The report can include various numerical, graphical, and other illustrative measures to show relevant information. After generating the reports, the reporting module 16 sends, via a message 13, the generated report to the educator 10. The educator 10 can review the contents of the generated reports.

The education framework 2 can use standard open technologies such as Linux, Apache, and MySQL to build the modules 6, 12, 14, and 16. The client system 20 and the server 4 can use platform independent programming languages to access the modules 6, 12, 14, and 16 and necessary programming components. Also, the client system 20 can include smartphones or other mobile devices. Each of the computers or mobile devices of the client system 20 and server 4 have a processor, portable storage, and a processor-readable storage medium that can include but is not limited to a floppy disk, a mini-disk, a CD-ROM, a DVD-ROM, flash memory, data tape, and other conventional storage media as may be known to those of ordinary skill in the art.

The invention utilizes a novel educational assessment technique for evaluating a student's progress that relies on key elements for progress monitoring, such as, but not limited to, usage, current program level, rate. The reports generated by the reporting module 16 illustrate usage, performance predictors for kindergarten through grade 3, and skill sets for grades 4 and above.

Information about student usage is valuable in determining whether students receive the greatest benefit from working on selected programs. Strong usage is likely to result in more progress through the selected programs and greater skill acquisition. For each user, usage is based on finding average weekly time (in minutes) the user worked on the selected predefined skill activities. Log in/log out time is updated when the student logs out for each student in the database 18 via the assessment module 6 and student performance data module 12. A user's average weekly time is obtained by summing daily times over an eight-week period and dividing by eight. The eight-week period includes 56 days prior to the current date. Usage information is provided only for students who use the program at least once over the eight-week period. The following descriptions define usage categories: Weak=average weekly time is less than or equal to 15 minutes; Fair=average weekly time is greater than or equal to 16 minutes but less than or equal to 44 minutes; Strong=average weekly time is greater than or equal to 45 minutes.

Information about usage status is available for individual students, classes, grades, schools and districts. Aggregate information can be obtained by averaging the total times of students in the group and dividing by the number of students in the group. Given that average weekly time is computed based on the 56 days prior to the current date, average weekly times during the first few weeks of use will include days with no use and is likely to be "Weak". As students accrue more weeks of use, the usage category becomes a better indicator.

Performance Predictors are a key component to monitoring student progress through the selected predefined skill activities. A performance predictor is a student's percent chance of reaching end-of-year benchmark. Performance predictors fall between 1%-99%. A student who has already reached end-of-the-year benchmark in a given month is assigned a performance predictor of 100%. Performance predictors are provided for kindergarten through third grade students who have used Lexia at least once in a given month and have shown a sequential progression through Lexia levels.

Performance predictors are calculated at the end of each month and made available on the first day of the following month. For example, a student with a performance predictor of 56% based on September performance will have this percentage displayed beginning October $1^{st}$ and remain during the whole month of October.

To determine performance predictors, a series of logistic regression analyses were performed to identify variables that were the strongest predictors in determining the likelihood of reaching end-of-year benchmarks. For every grade and month, certain variables were identified as most predictive. The most predictive variables received values reflecting their weights (predictive strength) in prediction equations for each month in each grade level. These prediction equations were used on a monthly basis (August 2010 to May 2011, as an example) to derive a student's percent chance of reaching end-of-year benchmark. There were one-to-three significant variables in each prediction equation. Examples of variables used in the prediction equations include current level (the student's level in Lexia Reading on the last day of the month), percent of current level complete (percentage of units completed in the current level on the last day of the month) and monthly rate (number of units per minute completed during the month).

A stratified random sampling procedure was used to obtain norm samples. First students are divided into six pools based on their total standard scores on the GRADE: 70 and below, 71-85, 86-100, 101-115, 116-130, greater than 130. Then 4, 28, 68, 68, 28 and 4 students are randomly sampled from these pools, respectively. Sampling in this manner guaranteed a sample of 200 students showing a normal distribution of reading scores. When sampling from these pools, one can consider ethnic background. Proportions of different ethnicities in accordance with national demographics are maintained. For example, for pools in which had an over-representation of Hispanic students, some Hispanic students are omitted from the pool (in a random fashion) and then sampled from the remaining students. In a few cases, there were not enough students in a pool to meet the sample quota for a normal distribution (e.g., third graders with standard scores greater than 130). In these cases an adjacent pool was sampled. Standard scores for students in the combined norm samples indicate a nearly perfect normal distribution.

An autoplacement feature was used to establish the initial Lexia Reading level for 94% of the students in the norm samples. Of the students who were autoplaced, 93% were autoplaced at the beginning of the 2010-2011 school year. The remaining students were autoplaced in the previous school year. Those students who were not autoplaced were assigned a level by their teacher (manual placement). Ninety-seven percent of the students showed a sequential progression through Lexia levels (i.e., worked on one Lexia Reading level at a time and moved on to the next level only when the current level was completed). For the remaining students more than one level was open for a period of time.

The norm samples are also used to derive recommendations of Lexia Reading use. The recommendations were based on analyzing the amount of use required for students identified as "High Risk" to reach end-of-year benchmarks. For this analysis one can chose students identified as "High Risk" in February. By this time students in the norm samples were clearly distinguishable in terms of their likelihood of reaching end-of-year benchmarks, yet there were enough months left in the school year for "High Risk" students to reach end-of-year benchmarks. The findings show somewhat different use patterns for kindergartners compared to first through third graders. In general, first through third graders required greater use than kindergartners to reach end-of-year benchmarks. Based on the findings, one can recommend between 50-70 minutes of Lexia Reading use per week for "High Risk" kindergartners and 80-100 minutes per week for "High Risk" first through third graders. Recommendations of use for students identified as "Some Risk" or "On Target" are less intense than for "High Risk" students, and are consistent with their likelihood of reaching end-of-year benchmarks. Given that the label "Some Risk" is applied to a wide range of performance predictors (31-79%), it is evident that not all "Some Risk" students will require the same amount of Lexia Reading use to reach end-of-year benchmarks. Thus, for "Some Risk" students with a 31-50% chance of reaching end-of-year benchmark we recommended higher amounts of Lexia Reading use than for "Some Risk" students with a 51-79% chance of reaching end-of-year benchmark.

Given that Lexia Reading users in grades 4-12 are nearly always below or well below grade level, norm samples for them were unable to be obtained. However, similar procedures to the ones described above to derive use recommendations were employed for students in grades 4-12. These students fall into one of three skill sets: basic, elementary or intermediate. Students who used Lexia Reading are examined for at least 45 minutes per week and progressed from level 1 of Strategies of Older Students (SOS) in February, 2011, to level 4 or 5 of SOS by the end of May, 2011. These students advanced from basic skill set to intermediate skill set. Overall, greater use for students in grades 7-12 are found compared to grades 4-6. Based on the findings, one can recommend between 90-120 minutes of Lexia Reading use per week for students in grades 4-6 and 100-150 minutes per week for students in grades 7-12. These recommendations apply to students who are working on basic skills in level 1 of SOS or any level of Early Reading or Primary Reading. Recommendations of use for students working on elementary or intermediate skill sets (levels 2-5 of SOS) are less intense than for students working on basic skills and are consistent with completing intermediate skills by the end of the school year.

Information about the performance predictor is available for students, classes, grades, schools and districts (for example, percentage of students in a school or district who fall under each of the performance predictor categories). Students are included in the aggregates if they used the program at least once during the last calendar month prior to the date in which the performance predictor status is provided.

In addition to providing the latest performance predictor, historic performance predictors are recorded monthly on the last day of each month and displayed on the first day of the subsequent month over the course of the school year.

Each program level is associated with a "skill set" based on the grade at which the skills in that level are typically taught. Information about skill set is provided for students in grades four and above to indicate the types of skills being worked on at their current (most recent) level.

The following are the skill sets used in accordance with the invention: Intermediate=skills approximately at a fourth-sixth grade level; Elementary=skills approximately at a second-third grade level; Basic=skills approximately at a kindergarten-first grade level. Information about skill set is provided for students, classes, grades, schools and districts. Students are included in the aggregates if they used the program at least once during the eight weeks prior to the date in which the skill set is provided. In addition to providing the latest skill set status, historic skill sets are recorded on the last day of each month and displayed on the first day of the subsequent month over the course of the school year.

For students in grades Kindergarten to third grade, based on student program level and rate of progress, the performance predictors can be used to indicate each student's percent chance of reaching the end-of-year benchmark for his or her grade level. Calculated on a monthly basis, the performance predictor is a critical measure of risk of potential reading failure. Predictors are calculated on the first day of each calendar month, based on a prior month's work. The first performance predictor is available the first day of second month of use. End-of-year benchmarks were established based on a normed sample as well as using grade level and state standards. The end-of-year benchmarks are correlated to performance on nationally used and previously validated progress monitoring tools that are independent of Lexia Reading. Each student's performance predictor or skill set determines the level of intensity of instruction needed to increase the likelihood of the student reaching end-of-year benchmark or to increase the grade level of the material the students are working on. This monthly prescription includes the number of minutes the student should use the program, in addition to available, recommended, scripted lessons for the teacher to target instruction.

Figure 2:
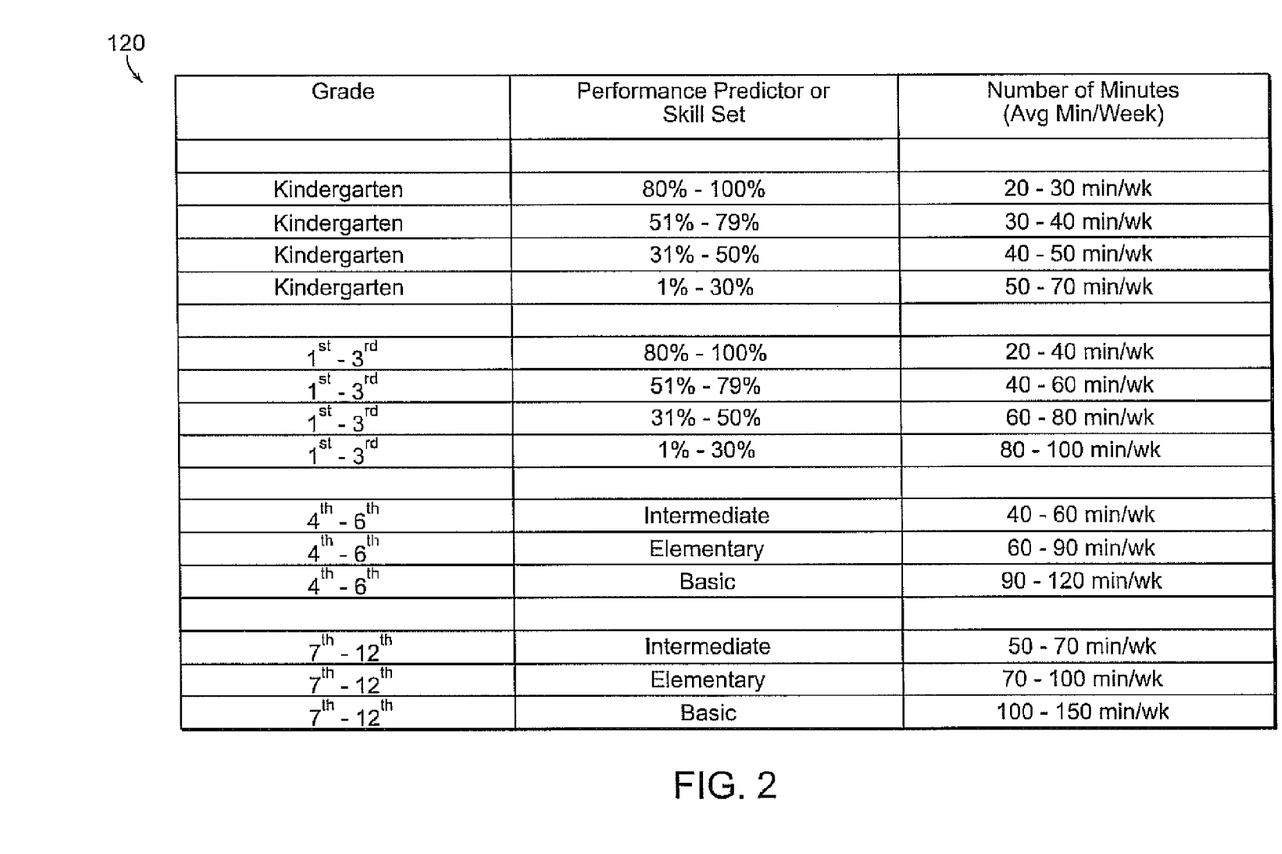
FIG. 2 is a table illustrating recommendations used in the Prescription of Intensity and categorized by grade, performance predictor, and skill set used in accordance with the invention.

FIG. 2 is a table 120 listing the Prescription of (Instructional) Intensity recommendations categorized by grade, performance predictor or skill set. These recommendations were determined through analysis of a normed sample as discussed above.

Figure 3:
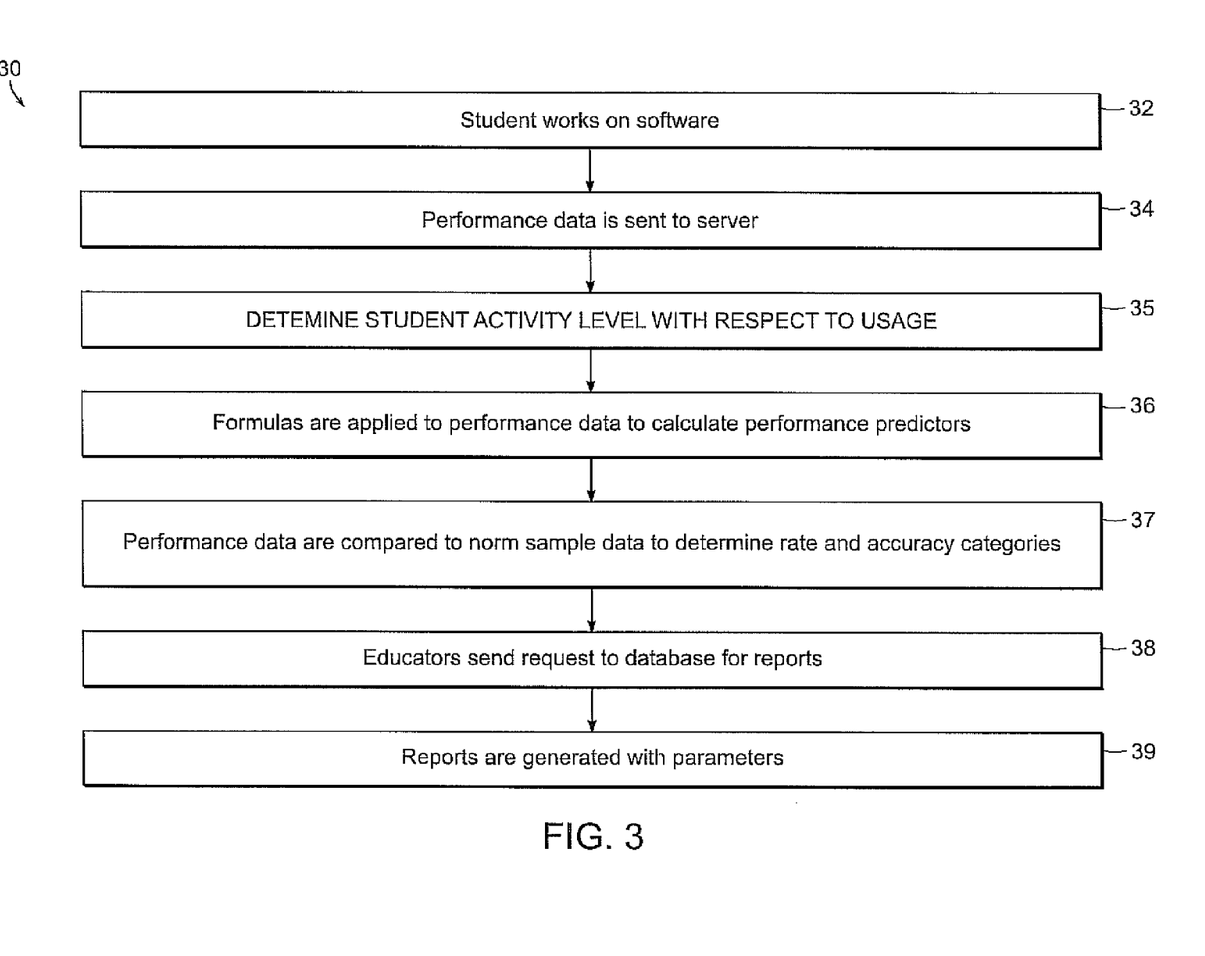
FIG. 3 is a process flow illustrating the calculation of current norm-referenced parameters used in accordance with the invention.

FIG. 3 is a process flow 30 illustrating calculating current performance predictors used in accordance with the invention. The assessment module 6 performs these steps and the results are stored in the database 18 for later retrieval by the student parameter module 14 and reporting module 16. As shown in step 32, the student works on their software program associated with their individualized skill activities where the performance data is sent back to the server 4 to be stored via the assessment module 6 and database structure 18, as shown in step 34. For every month, on the last day of the month all the students who have worked in the last month including those in Kindergarten, first grade, second grade, or third grade, their student activity level information with respect to their usage is determined, as step in 35. The assessment module 6 retrieves this information from the database structure 18. Also, it is important to determine the current norm referenced data for comparison. This is accomplished by calculating the month offset into the school year from the current date using the school's start month and year. Note that the month offset for calculations run on the first day in a month, is the offset of the previous month since the calculation is for the previous day. The assessment module 6 stores the current performance predictor values attained in the database structure 18. Moreover, the current performance data of each of the students are compared against the month and the student's grade and put into proprietary formulas, as shown in step 36. Based on the norm sample data, a student's current rate and accuracy categories are determined by comparing performance data to the norm sample, as shown in step 37. As mentioned earlier, the current performance predictors are defined as follows: On Target, Some Risk, and High Risk. Afterwards, the assessment module 6 stores the performance predictors for later retrieval to the database 18. Moreover, educators can send requests to the reporting module 16 for reports, as shown in step 38. The reporting module 16 generate reports with the parameters calculated, as show in step 39.

Figure 4:
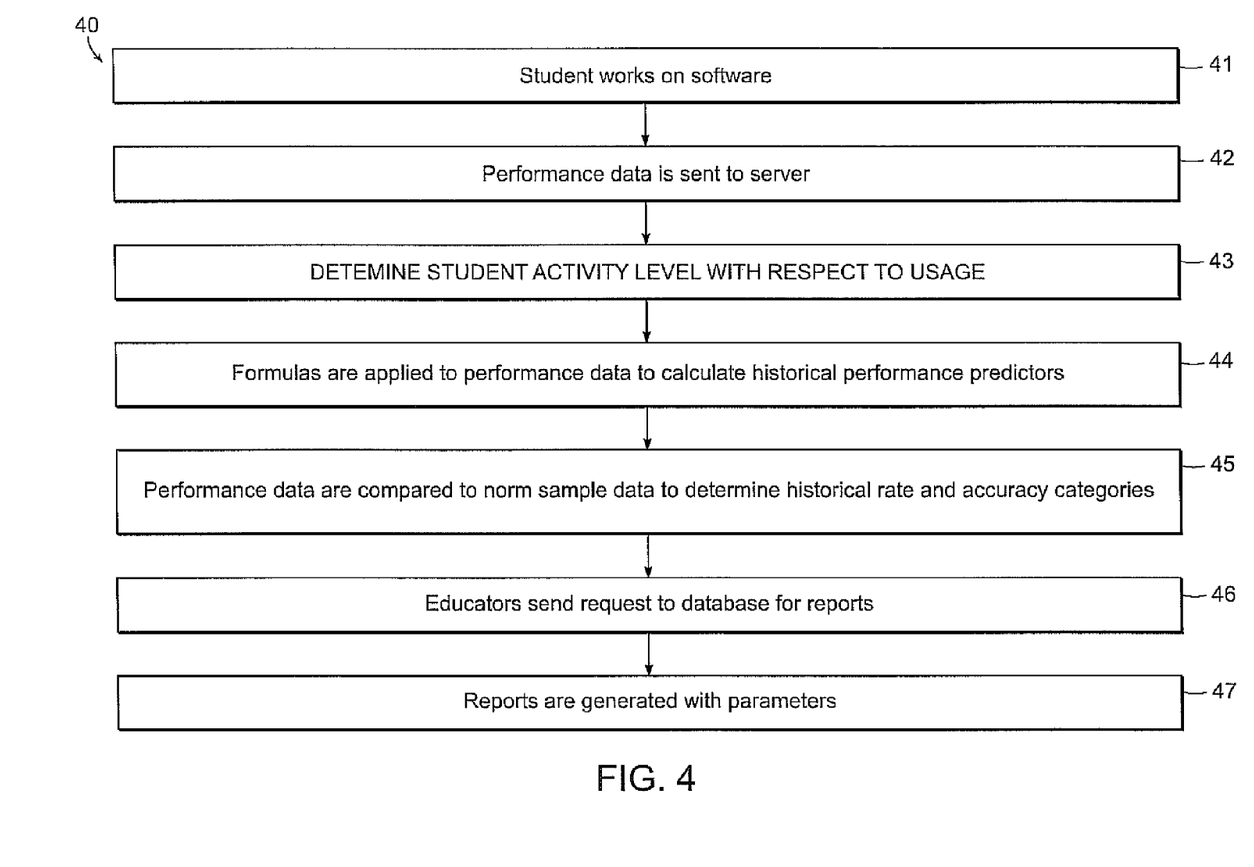
FIG. 4 is a process flow illustrating the calculation of historical norm-referenced parameters used in accordance with the invention.

FIG. 4 is a process flow 40 illustrating calculating historical performance predictors used in accordance with the invention. Historical performance predictors are calculated on the first of the month by the assessment module 6. The assessment module 6 stores the computed historical performance predictors in the database structure 18 for comparison purposes. As shown in step 41, the student works on their software program associated with their individualized skill activities where the performance data is sent back to the server 4 to be stored via the assessment module 6 and database structure 18, as shown in step 42. As shown in step 43, on the first of the month, for every student who has worked in the program the prior month the usage activity or activity level with the program is computed. This entails getting the last activity the student worked on in this time period, getting the level of the last activity the student worked on, and getting the start date of the student's school. The historical performance predictors are determined for each student for comparison purposes by using proprietary formulas that are applied to the performance data to calculate historical performance predictors, as shown in step 44. The historical performance predictors are calculated after the first month of program use in the school year after the school's start date for the year. Afterwards, performance data are compared to norm sample data to determine historical rate and accuracy categories, as shown in step 45. Afterwards, the assessment module 6 stores the historical performance predictors for later retrieval to the database structure 18. Moreover, educators can send requests to the reporting module 16 for reports illustrating the historical predictors, as shown in step 46. The reporting module 16 generate reports with the parameters calculated, as show in step 47.

Based on the proprietary formulas for the month and grade of the student, a student historical performance predictor is calculated, as shown in step 44. As mentioned earlier, the performance predictors are defined as follows: On Target, Some Risk, and High Risk. Afterwards, the assessment module 6 stores the historical performance predictor to the databases structure 18 for later retrieval.

Figure 5:
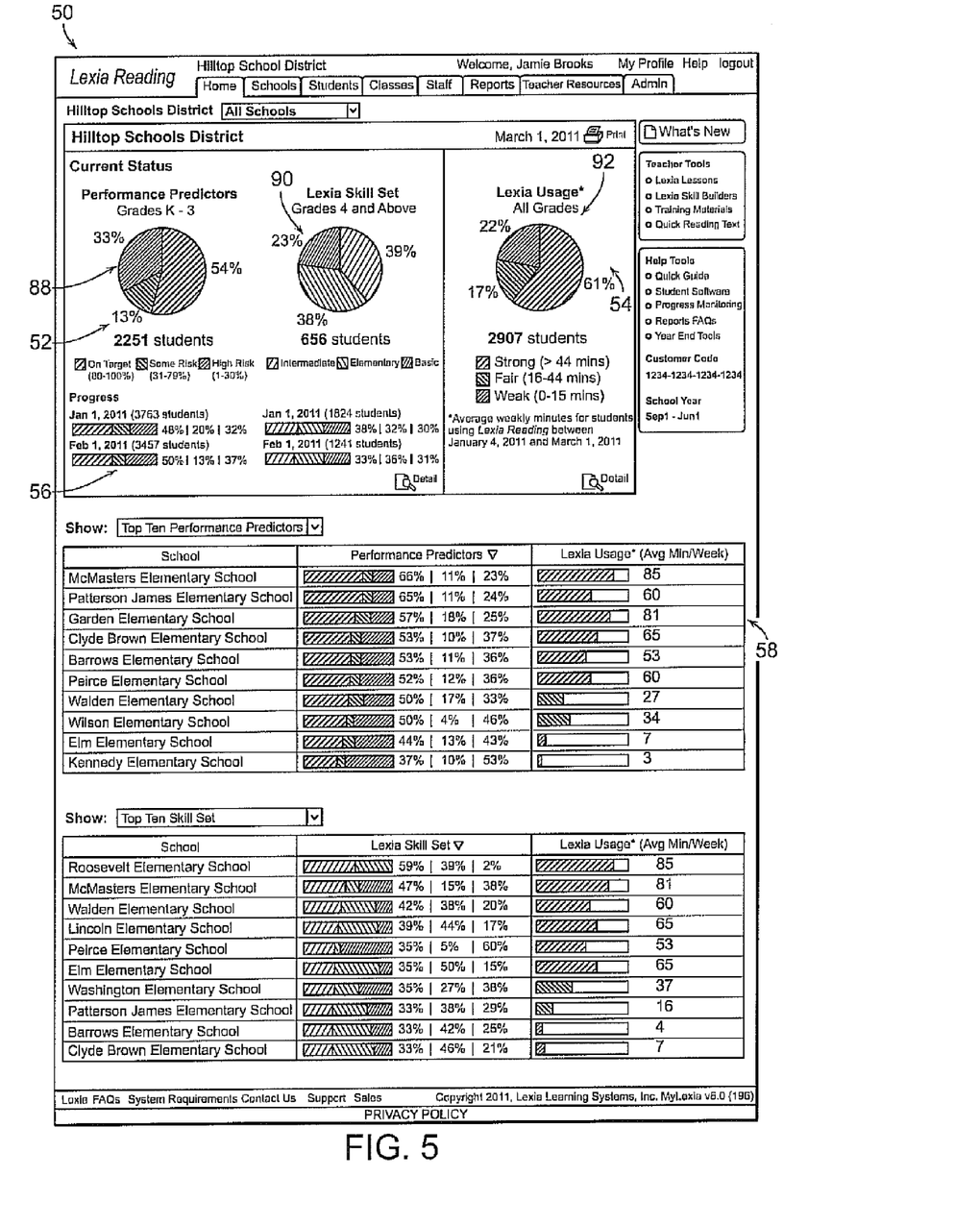
FIG. 5 is a schematic diagram illustrating a district report generated by the reporting module in accordance with the invention.

FIG. 5 is a schematic diagram illustrating a district report 50 generated by the reporting module 16 in accordance with the invention. The report 50 includes regions 52, 54, 56, and 58 that illustrate specific information for district officials. The region 52 defines the current performance status of the students in the districts. In particular, a number of pie charts 88, 90 illustrate the performance predictors and skill sets of the students that are provided by the process in FIG. 3. The region 56 shows the progress section that displays the percentage of students in each performance predictor and skill set category in monthly intervals. As the school year progresses one can gauge student progress by monitoring how the percentages of performance predictors and skill set categories are increasing or decreasing. Progress is measured monthly and displayed in month segments, and includes all students who used the program at least once in the previous calendar month for kindergarten through third grade and at least once in the last eight weeks for students in fourth grade and above. Region 54 shows a usage pie chart 92 displaying student program usage based on average weekly minutes for the past 8 weeks. The usage pie chart 92 includes all grades, and therefore the number of students will be the total number of students in the performance predictors and skill set pie charts 88, 90. This includes only students who have used the program at least once in the previous calendar month for kindergarten through third grade and at least once in the last eight weeks for students in fourth grade and above. Region 58 shows the school tables providing a concise overview of usage and status for a district's top/bottom ten schools. These tables feature the most recent snapshot of performance predictors, skill sets, and usage data. A district official can view schools by clicking any school name to view a school's performance predictors and skill set percentages by grade (for example, all of the school's current status, progress, and usage information). If a district official wants to see schools sorted differently they can use the drop-down menus to view the Top/Bottom ten performance predictor, Top/bottom ten skill sets, and Top/Bottom ten schools by usage. You can further sort the list by clicking any column header. Also, status overall and status for grades in a certain school or district can be viewed according to the Top/Bottom ten performance predictor, Top/bottom ten skill sets, and Top/Bottom ten usage.

Figure 6:
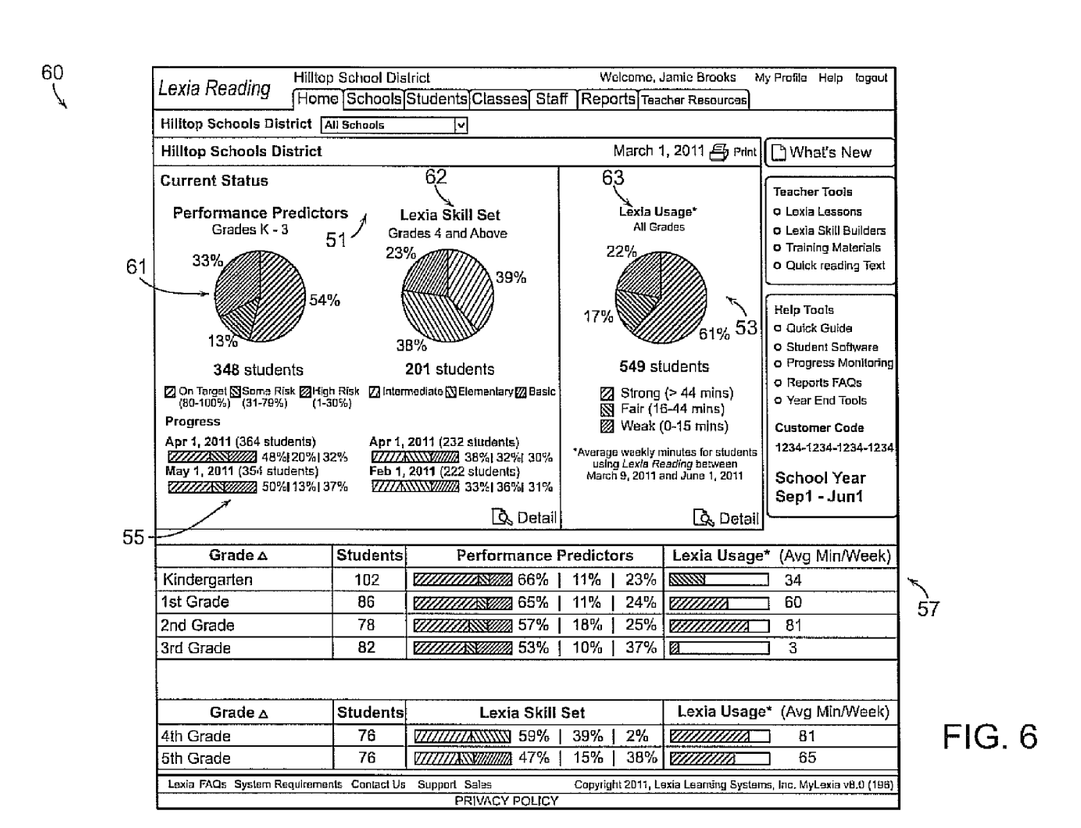
FIG. 6 is a schematic diagram illustrating a school report generated by the reporting module in accordance with the invention.

FIG. 6 is a schematic diagram illustrating a school report 60 generated by the reporting module 16 in accordance with the invention. The report 60 includes a number of regions 51, 53, 55 and 57 that illustrate assessment and usage information specific for a school. The region 51 shows the performance predictors and skill sets of the students in a school. With respect to the performance predictors, they are assigned the following identifiers: On Target, Some Risk, and High Risk. With respect to the skill sets, they are assigned the following identifiers: Intermediate, Elementary, and Basic. Moreover, the region 51 includes pie charts 61, 62 illustrating a current snapshot of performance predictors and skill sets of only students who have used the Lexia Reading at least once in the past 8 weeks.

Region 53 shows the progress section that displays the percentage of students in each performance predictor and skill set category in monthly intervals. As the school year progresses, one can gauge student progress by monitoring how the percentages of performance predictors and skill sets are increasing or decreasing. Region 55 includes a usage pie chart 63 that displays student program usage based on average weekly minutes for the past 8 weeks. The usage pie chart 63 includes all grades and therefore the number of students will total the number of students in the performance predictors and skill set charts 61, 62. The pie chart 63 shows only the student who have used the Lexia Reading program at least once in the past 8 weeks. Region 57 shows the school's grade table providing a concise overview of a school's current status. These tables feature the most recent snapshots of performance predictors, skill set, and usage data.

District users can view schools by any school name to view a school combine report, for example, all of the school's current status, progress, and usage information. If your district has more than 10 schools one can use the drop-down menus to view the Top/Bottom ten performance predictors, Top/Bottom ten skill sets, and Top/Bottom ten usage. One can further sort the list by clicking any column header. School user can view grades. If a school has more than 10 grades, one can use the drop-down menu to view Top/Bottom ten performance predictors, Top/Bottom ten skill sets, Top/Bottom ten usage. One can also sort the list by clicking any column or header.

Figure 7:
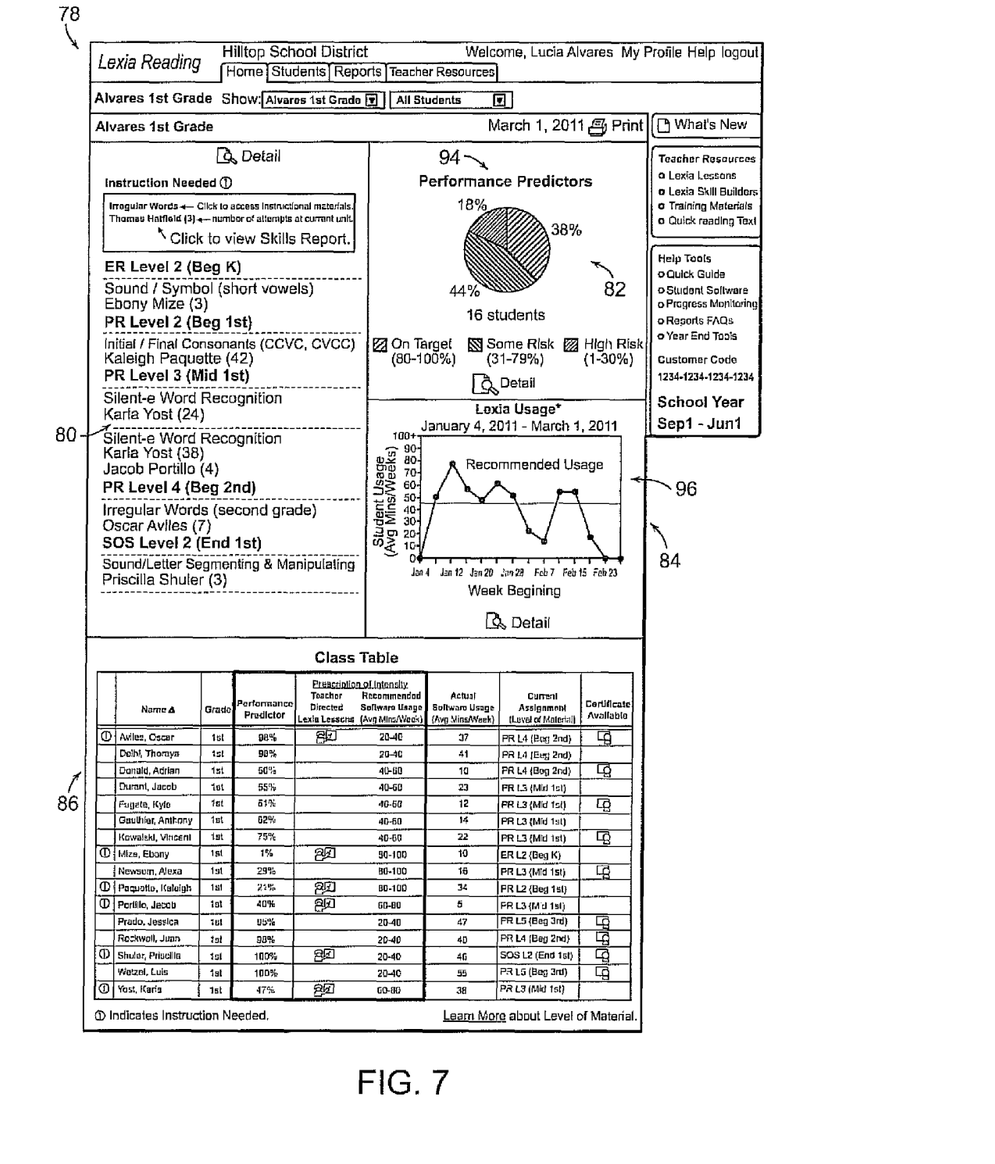
FIG. 7 is a schematic diagram illustrating a teacher report generated by the reporting module in accordance with the invention.

FIG. 7 is a schematic diagram illustrating a teacher report 78 generated by the reporting module 16 in accordance with the invention. The report 78 includes number regions 80, 82, 84, and 86 that illustrate assessment and usage information specific for a class. Region 80 shows an instruction needed list that displays all students in a class who are struggling with an activity and may require explicit teacher-directed instruction in order to progress. Students are grouped according to the program level and skills in which they are struggling in order to facilitate small group instruction. A teacher can click on a skill name to view a selected predefined lesson that can be used in a teacher-led instructional session with students. By clicking a student name, a student skills report is provided for a detailed look at the student's current and past performance.

Region 82 shows a pie chart 94 displaying the performance predictor and/or skill set, depending on the grade(s) of the student in the class. The chart 94 is a snapshot of current and includes only students who have used the program at least once in the last calendar month for students in grades K-3 and at least once in the past 8 weeks for students in grades 4-12. Region 84 shows a usage line graph 96 displaying the average minutes per week of use for the entire class. A shaded region indicates the overall or general recommended levels of usage. This graph 96 includes all students in the class who have used the program at least once in the past 8 weeks. By clicking the detail button under the class usage graph 96, each student's average weekly usage and total usage is displayed.

Region 86 shows a student table providing a concise overview of the class by reporting each student's current status. In particular, if a student is struggling a special icon is displayed and by clicking on the student's name, the teacher can view the student combined report that shows usage, performance and skill completion status. Moreover, the student's average weekly program usage over the past 8 weeks is displayed. The report 78 shows the student's current program assignment. Each student should have only one assigned at a time. When a student is determined to be struggling with one or more units a special icon is displayed in the "Lessons" column and an icon drawing attention to the student is displayed next to the student name. By clicking the special icon in the "Lessons" column, a lesson is provided to a teacher that can be used for teacher-led, small group instruction. When a student has completed a program level in the past two weeks, an icon is displayed in the "Certificate Available" column. By clicking this icon, detailed information regarding the achievement certificate is provided.

Figure 8:
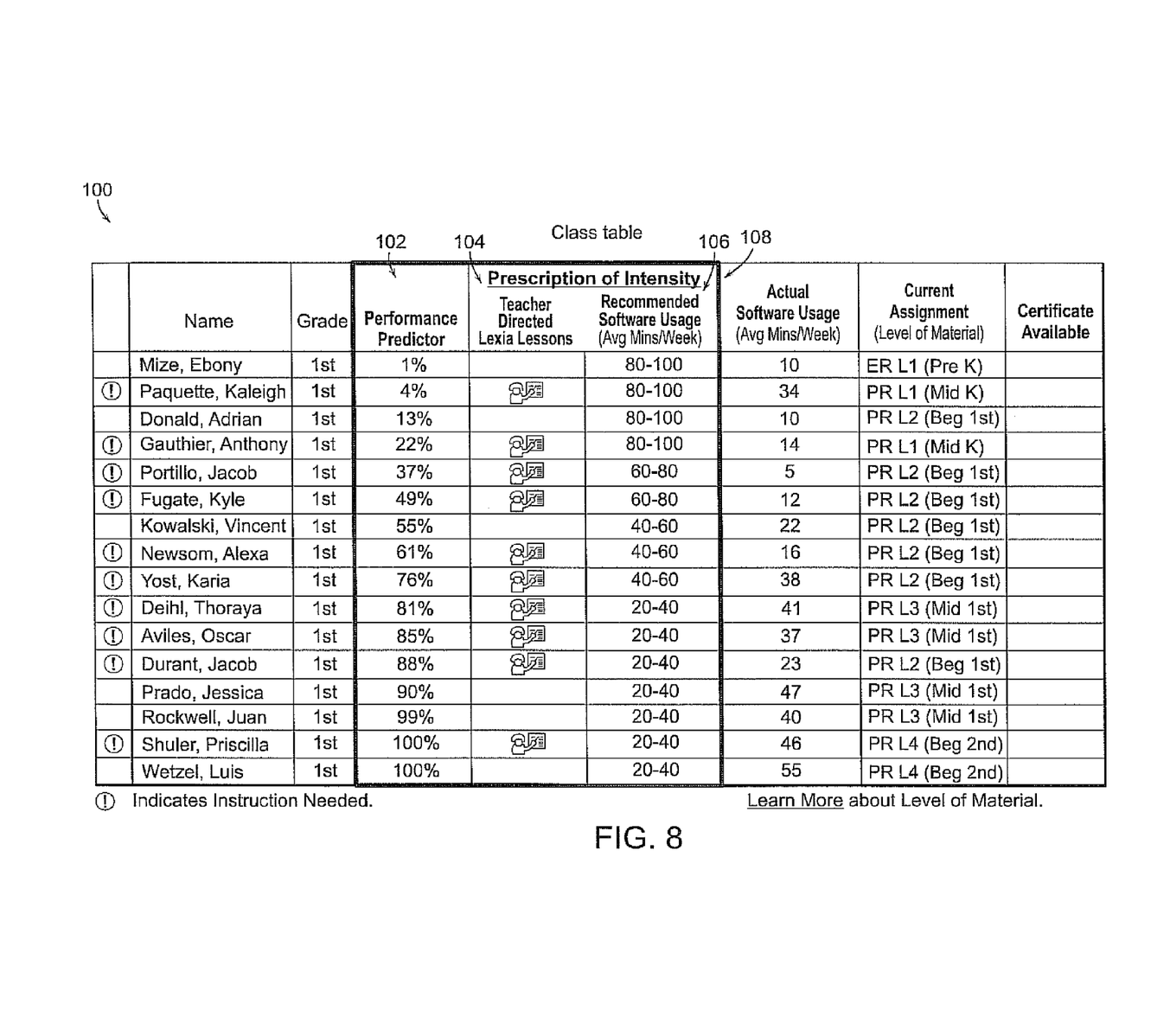
FIG. 8 is a schematic diagram illustrating a section of a teacher report generated by the reporting module in accordance with the invention using performance predictors.

FIG. 8 is a schematic diagram illustrating a section of a teacher report 100 generated by the reporting module 16 in accordance with the invention that uses performance predictors. The performance predictors can also be displayed for each of the students in a separate column 102. Column 102 will display skill sets for students in grades 4-12. A teacher can sort by performance predictors, which would in turn sort the recommended usage column 106 into 4 groupings (for ease of planning). The lines 108 around the three columns 102, 104, 106 indicate that the performance predictor or skill set drives the prescription of intensity. By putting the lessons along with recommended program usage under the prescription of intensity, one can drive home the message that it is not only more time on the computer but teacher intervention that can improve performance. The teacher has the two usage columns next to each other for easy comparison.

The invention provides an education framework that allows for assessment without testing. This invention allows for direct control and easier access to student information that provides districts, schools, and teachers a better understanding of the educational development of their students. Also, the invention provides customized, easy-to-understand reports that allow users to understand thoroughly the performance of their students as well as a way to help address student's difficulties, all without stopping instruction time to administer a traditional test.

Although the present invention has been shown and described with respect to several preferred embodiments thereof, various changes, omissions and additions to the form and detail thereof, may be made therein, without departing from the spirit and scope of the invention.

What is claimed is:

1. A system for educational assessment without testing comprising: one or more client systems that are connected to a network allowing students or educators to communicate with an education framework that performs and manages educational assessment, the one or more client systems that issue a message to the education framework requesting a task to be performed, the educational assessment is administered independent of one or more educators so as to avoid interruption of instruction time; and a server system that receives the message such that the education framework proceeds to process the contents of the message, the server system implementing an assessment module configured to calculate an education assessment by evaluating a student's quantified usage as well as a plurality of other student performance variables in determining whether a student is receiving benefit from using the education framework, the assessment module configured to calculate an average weekly usage time from the student's quantified usage, and compare the average weekly usage time to a norm sample to define a comparison value, and to use the comparison value with the other student performance variables to produce a performance predictor which specifically measures a student's chance of meeting a predefined benchmark, wherein a reporting module implemented by said server system simultaneously generates reports including (1) said performance predictor from a plurality of quantified risk performance variables for said students of a particular grade level, and (2) an indication of a skill set from a plurality of quantified skill sets for said students of said particular grade level to produce a prescription for each of said students, said quantified risk performance variables include a first set of a plurality of identifiers and said quantified skill sets include a different second set of a plurality of identifiers, said prescription is categorized by at least said first set of identifiers and said second set of identifiers and includes both a time said student of a particular grade level should use the system, and available lessons to target instruction, the performance predictor indicating each student's percent chance of reaching the predefined benchmark for a defined grade level and measuring the risk of failure, the benchmark is based on the norm sample and is correlated with other established progress monitoring tools allowing assessment of each student's performance predictor and determines a level of intensity of instruction needed to increase a likelihood each student meets the predefined benchmark.

2. The system of claim 1, wherein the students perform one or more selected daily skill activities.

3. The system of claim 2, wherein the server system further implements a student performance data module that analyzes the performance data of one or more selected daily skill activities and calculates the plurality of other student performance variables used in the educational assessment of the student.

4. The system of claim 3, wherein the student performance data module stores the plurality of other student performance variables in a database.

5. The system of claim 1, wherein the one or more benchmarks are calculated by determining a percentage of the students in the norm sample that completed each level of the one or more selected daily activities.

6. The system of claim 5, wherein the one or more parameters select a skill set that defines the educational level the student achieves using daily skills activities.

7. The system of claim 3, wherein the reporting module generates reports illustrating the student performance variables in a fashion that assists educators in the educational assessment of a student, class, school or district.

8. A method of performing educational assessment without comprising a test event comprising:
providing one or more client systems that are connected to a network allowing students or educators to communicate with an education framework executed on a server system that performs and manages educational assessment, the one or more client systems configured to issue a message to the education framework requesting a task to be performed, the educational assessment is administered independent of one or more educators so as to avoid interruption of instruction time; and
receiving the message and processing, via the education framework, the contents of the message, the education assessment is calculated via an assessment module implemented by the server system by evaluating a student's quantified usage as well as a plurality of other student performance variables in determining whether a student is receiving benefit from using the education framework, the student's quantified usage and the other student performance variables are used to produce a performance predictor which specifically measures a student's chance of meeting a predefined benchmark, the assessment module calculating an average weekly usage time from the student's quantified usage and the other student performance variables and comparing the average weekly usage time to a norm sample to produce the performance predictor, wherein a reporting module implemented by said server system simultaneously generates a report including (1) said performance predictor from a plurality of quantified risk performance predictors for said students of a particular grade level the student's quantified usage and the other student performance variables, and (2) an indication of a skill set from a plurality of quantified skill sets for said students of said particular grade level to produce a monthly prescription for each of said students, said quantified risk performance variables include a first set of a plurality of identifiers and said quantified skill sets include a different second set of a plurality of identifiers, said prescription is categorized by at least said first set of identifiers and said second set of identifiers and includes both the time said student of a particular grade level should use the system, and available lessons to target instruction, the performance predictor indicating each student's percent chance of reaching the defined benchmark for a defined grade level and measuring the risk of failure, the benchmark is based on the norm sample and are correlated with other established monitoring tools allowing assessment of each student's performance predictor and determine the level of intensity of instruction needed to increase the likelihood each meets the defined benchmark.

9. The method of claim 8, wherein the students perform daily skill activities.

10. The method of claim 9, wherein the server system further implements a student performance data module that analyzes the performance data of the student using the program and calculates the plurality of other student performance variables used in the educational assessment of the student.

11. The method of claim 10, wherein the student performance data module stores the plurality of other student performance variables in a database.

12. The method of claim 8, wherein the end-of-year benchmark is calculated by determining a percentage of the students in the norm sample that completed each level of the one or more selective educational assessment programs.

13. The method of claim 12, wherein the plurality of other student performance variables determine a skill set that defines the educational level the student achieves using the one or more educational programs.

14. The method of claim 10, wherein the reporting module generates reports illustrating the plurality of other student performance variables in a fashion that assists educators with the educational assessment of a student, class, school or district.

15. A memory device for storing a program being executed on an education framework, the program performs a method of performing educational assessment without comprising a test event, the method comprising:
allowing students or educators to communicate with an education framework executed on a server system that performs and manages educational assessment using one or more client systems that are connected to a network, the one or more client systems issue a message to the education framework requesting a task to be performed, the educational assessment is administered independent of one or more educators so as to avoid interruption of instruction time; and
receiving the message and processing, via the education framework, the contents of the message, the server system implementing an assessment module configured to calculate the education assessment by evaluating a student's quantified usage as well as a plurality of other student performance variables in determining whether a student is receiving benefit from using the education framework, the assessment module configured to calculate an average weekly usage time from the student's quantified usage, and compare the average weekly usage time to a norm sample to define a comparison value, and to use the comparison value with the other student performance variables to produce a performance predictor which specifically measures a student's chance of meeting a predefined benchmark; wherein a reporting module implemented by said server system simultaneously generates a report including (1) said performance predictor from a plurality of quantified risk performance variables for said students of a particular grade level, and (2) a skill set from a plurality of quantified skill sets for said students of said particular grade level to produce a monthly prescription for each of said students, said quantified risk performance variables include a first set of a plurality of identifiers and said quantified skill sets include a different second set of a plurality of identifiers, said prescription is categorized by at least said first set of identifiers and said second set of identifiers and includes both the time said student of a particular grade level should use the system, and available lessons to target instruction, the performance predictor indicating each student's percent chance of reaching the defined benchmark for a defined grade level and measuring the risk of failure, the benchmark is based on the norm sample and are correlated with other established progress monitoring tools allowing assessment of each student's performance predictor and determine the level of intensity of instruction needed to increase the likelihood each meets the defined benchmark.

16. The memory device of claim 15, wherein the students perform daily skill activities.

17. The memory device of claim 16, wherein the server system further implements a student performance data module that analyzes the performance data of the student using the program and calculates the plurality of other student performance variables that are used in the educational assessment of the student.

18. The memory device of claim 17, wherein the student performance data module stores the plurality of other student performance variables in a database.

19. The memory device of claim 15, wherein the end-of-year benchmark is calculated by determining a percentage of the students in the norm sample that completed each level of the one or more selective educational assessment programs.

20. The memory device of claim 15, wherein the plurality of other student performance variables determine a skill set that defines the educational level the student achieves using the one or more educational programs.

21. The memory device of claim 17, wherein the reporting module generates reports illustrating the plurality of other student performance variables in a fashion that assists educators with the educational assessment of a student, class, school or district.

22. The system of claim 1, wherein the student's quantified usage is determined based on the student's use of the education framework to perform individualized skill activities.

23. The system of claim 1, wherein the performance predictor is associated with one of "On Target," "Some Risk," and "High Risk".

24. The system of claim 1, wherein each student performance variable from the plurality of other student performance variables includes a weight associated with a predictive strength of that student performance variable.

* * * * *